Jan. 29, 1935. W. A. PARR 1,989,287
COOKING AND MOLDING DEVICE
Filed Sept. 25, 1933
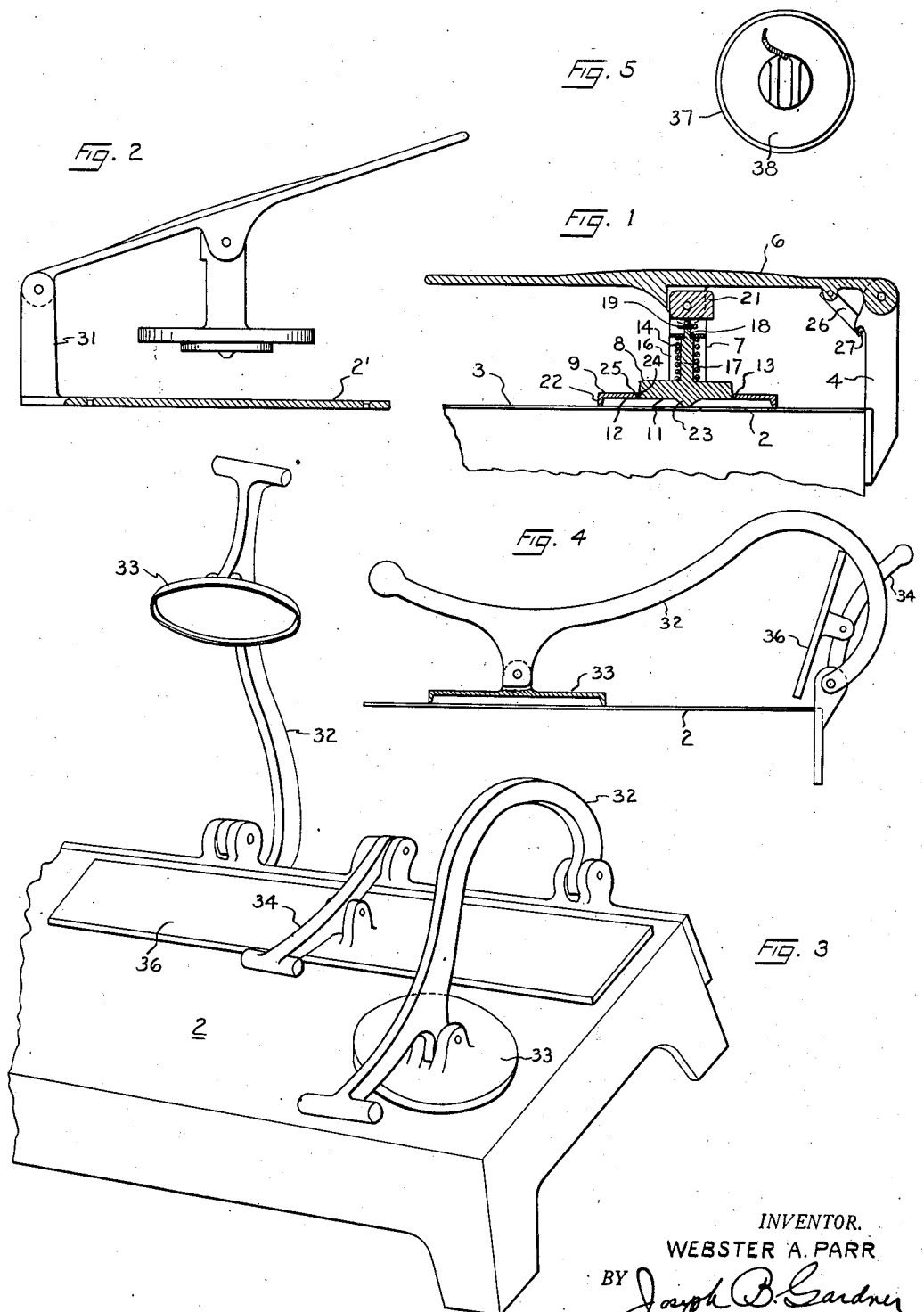
INVENTOR.
WEBSTER A. PARR
BY Joseph B. Gardner
ATTORNEY.

Patented Jan. 29, 1935

1,989,287

UNITED STATES PATENT OFFICE 1,989,287

COOKING AND MOLDING DEVICE

Webster A. Parr, Alameda, Calif.

Application September 25, 1933, Serial No. 690,967

4 Claims. (Cl. 107—66)

The invention relates to devices for cooking and for shaping into desired form, foods such as hamburger and the like.

An object of the invention is to provide, as a unitary part of a cooking top, a means which will cooperate with said top in molding the food to the desired shape, confining in the food its natural juice and savor during the cooking operation, and insuring an even and uniform cooking of all parts of the food with a minimum expenditure of heat units.

Another object of the invention is to provide a device of the character described which may be operated with practically no effort on the part of the operator and does not require the latter to handle the food or any of the parts of the device designed to come in contact with the food.

A further object of the invention is to provide a means of molding the food to the desired shape, which will spread the food uniformly all over the mold without danger of packing the food unevenly and creating lumps therein.

A still further object is to provide a means with the above advantages, which will permit the release of the molded or cooking product without handling by the operator.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a sectional view of the device of my invention with the molding and cooking means combined in one unit.

Figure 2 is a side view of the device designed for use as a mold unit alone.

Figures 3 and 4 are perspective and side views respectively of the device, of a form in which the cooking feature predominates.

Figure 5 is a plan view of a modified form of the cooker head.

The device of my invention in the embodiment illustrated includes a plate 2 which, in the form of the invention shown in Figure 1, is a part of a cooking unit 3 of which the plate 2 comprises the cooking top or grill. The source of heat for the cooking unit may be of any form desired; however, for most uses electricity provides the most convenient and adaptable form.

Pivotally connected to the unit and preferably by attachment to one or more ears 4 fixedly retained on the latter, is an arm or lever 6 carrying a member 7 arranged for cooperation with the plate. The pivotal connection of the lever and unit is adjacent the rear of the plate so that the lever may be swung to a position overlying the plate or to a position removed from over the plate and resting at the rear thereof. The member 7 is designed to serve in cooperation with the plate as a means of shaping the food preparatory to cooking and of confining the food on the plate during the cooking operation. Included as a part of member 7 are concentric center and rim disk portions 8 and 9 respectively, which are carried in such manner as to render one movable axially relative to the other but may be held with their respective food engaging surfaces 11 and 12 in coplanar or other desired relation. The disk portion 8 is movable in an opening 13 in disk portion 9 and is normally held in a relatively extended position with the faces 11 and 12 out of alignment, by means of a spring 14 interposed between portion 8 and a yoke 16 fixed to the portion 9. Support of the portion 8 is afforded through means of a stem 17 fixed thereto and slidable in a hole 18 in the yoke. The spring 14 encloses the stem and the latter is held in the yoke by means of a pin 19. An extension 21 of the yoke, and preferably detachably secured to the yoke, is the part by which pivotal connection of the member is made with the lever. Along the periphery of the disk portion 9 is provided a downwardly extending flange 22 which is designed in the operative position of the member to engage the plate 2 and thereby hold the surface 12 spaced from the plate and at the same time close the space thus formed between the disk and plate. The connection between the member 7 and the lever is such that the former may be swung to a limited degree in any direction. In this manner when the member is not engaged with the plate, and the lever is moved to position the disk portions on the plate, the member will readily centralize itself on the plate and thereby insure contact of the flange 22 with the plate along its entire length. Likewise a sufficient looseness in the fit of the stem in the yoke is provided so that the portion 8 may readily move in portion 9 without binding or interfering with the centralizing of the portion on the plate on initial contact therewith. Spacing of the surface 11 of portion 8 from the plate on engagement of the member with the plate is afforded by means of a stud 23 extending from the center of portion 8 and being of the same axial depth as the flange 22 so that with flange and stud in contact with the plate the surfaces 11 and 12 of the disk portions will be coplanar. In order to insure a closed joint between the disk portions when both are operatively engaged with the plate, the co-engageable edge-faces 24 and 25 of the portions 8 and 9 are tapered so as to make tight contact in said relation.

In the use of the device as thus designed, assuming the member to be removed from over the plate, the food to be shaped and cooked is placed in such position on the plate as to permit the member to overlie the same when moved to operative position. The food, such as in the case of hamburger, is put on the plate in the form of a ball, cube, or the like, and therefore the first step in the operation of the device is to press the hamburger into the form of a patty so as to facilitate the frying or grilling operation. To thus shape the hamburger, the lever is brought over the plate to bring the disk portions against the meat, the disk portion 8 by reason of its central and protruding relation being usually the first portion of the member to contact. The lever is then forced downward whereby the portion 8 against the resistance of spring 14 will flatten the meat and press portions thereof outwardly in the area of the disk portion 9. As soon as the portion 8 reaches its limit of movement against the plate, the portion 9 will complete the flattening of the meat and simultaneously shape the latter and keep it confined within the flange 22. In this way the hamburger will be formed of the proper thickness, shape, and uniformity of texture, and at the same time will be completely and tightly enclosed on all sides. To retain the parts in the operative enclosed position about the hamburger, a latching device such as a pawl 26 on the lever is hooked over a catch 27 on the stove unit. With the hamburger thus disposed, and heat being applied to the plate, a most thorough and tasty cooking of all the ingredients of the hamburger will be accomplished in short order, a minimum of grease or other frying medium will be required, and very little smoke will be given off.

When the cooking operation is completed, the lever may be released, and due to the fact that the outer disk portion 9 will lift off the hamburger in advance of the center portion 8, any hold which the hamburger may have on the member will be loosened and the former will remain on the plate free and clear after both disk portions are raised. Such releasing action of the member will likewise take place should it be desired to use the device merely for forming and shaping the hamburger, and then remove the latter without cooking it.

In Figure 2 the device is constructed without the cooking feature, and is designed primarily for use as a molding and shaping means exclusively. In this embodiment, instead of the lever and member 7 being attached to the cooking plate or unit, it is combined with a plate 2' arranged to be secured to a suitable table or other support and has provided thereon a standard 31 to which the lever is pivoted.

In the embodiment illustrated in Figures 3 and 4 a cooking and shaping unit is provided having a plurality of the levers 32 and associated members 33; the portion of the latter however designed to provide the surface for cooperation with the cooking surface, instead of being made in relatively movable sections, is formed as a one piece element. As is the case with the design illustrated in Figure 1, each lever may be swung back to a position of rest at the rear of the plate, and the location of the pivot for the lever and the form of the lever is such that when the lever is moved to the rear position it will abut the rear side of the unit and the weight of the lever and associated member will cause the lever to be retained in such position in substantially the same manner as the lever and disk are held in operative position when disposed over the plate. Preferably in this embodiment there is provided on the unit at a point mediately of the levers an additional lever 34 which carries thereon a shaping and enclosing element 36 of rectangular instead of the circular form of the disk 32. The lever 34 with element 36 may also be moved to a front operative position or to a rear inoperative position with the weight thereof holding same in both such positions. It will be noted from Figure 3 that although the element 36 is arranged when operative to assume a position considerably to the rear of elements of levers 32 when correspondingly disposed, the ends of element 36 extend beyond the levers 32 and therefore, in order to permit the positioning of the lever 34 and element 36 in the operative and inoperative positions, irrespective of the position of the levers 32, the latter are curved outwardly sufficient to allow complete clearance of the element 36. With the element 34 of the form and relatively large size shown, it may be used to accommodate several food articles such as slices of bread for toasting.

A further modified form of shaping and enclosing disk 37 is shown in Figure 5. In this embodiment an electric heating element 38 is enclosed in or otherwise associated with the disk, thus making it possible to heat the food with the disk 37 separately of or in conjunction with the heating means of the stove unit.

I claim:

1. In a device of the character described, the combination with a support providing a substantially flat horizontal top surface, a lever pivotally connected thereto for vertical motion, a shaping and confining member comprising a section with a central opening therein and a bottom surface for cooperation with said first surface, connection means between said lever and section affording said section a limited universal movement relative to the lever, an inner section providing a closure for and advancable and retractible in said opening and having a bottom surface arranged to lie substantially coplanar with the bottom surface of the first section when the second section is in retracted position and having the sides thereof tapered to engage the sides of said opening upon movement thereof to retracted position, means to slidably carry the second section by the first section, a spring normally retaining said second section in advanced position, means on the second section to retain the bottom surface thereof spaced from said top surface when moved thereagainst, and a continuous flange depending from the outer edge of the bottom surface of the first flange of substantially the same depth as said last means.

2. In a device of the character described, a cooking plate, a pair of vertically movable and correspondingly positioned horizontally spaced levers connected to said plate adjacent the rear thereof, a confining and shaping element pivotally carried by each of said levers for cooperative engagement with said plate and being movable with the associated lever to and from the plate, a third lever connected to said plate mediately of the first levels and movable similarly thereto, a confining element pivotally carried by the third lever and extending beyond the plane of movement of the first levers, said first levers being designed and arranged to permit movement of the third lever and the associated element on and off said plate irrespective of the position of the first levers.

3. In a device of the character described, the combination with a support providing a substantially flat top surface, an enclosing and shaping member mounted for movement to and from said surface and comprising an outer section having an opening therethrough, an inner section movable axially through said opening and arranged in a retracted position to dispose the lower surface thereof substantially coplanar with that of the outer section for cooperation with said first surface for shaping an article between the first and second mentioned surfaces, said inner section being arranged to normally assume a position more axially extended toward said first surface than the other section when said sections are positioned for effecting cooperation with said first surface and having the sides thereof tapered for engaging the sides of said opening when moved to and for stopping the same in retracted position.

4. In a device of the character described, a cooking plate, a pair of levers pivotally mounted adjacent the rear of said plate and movable thereover, a confining and shaping element carried by each of said levers for cooperative engagement with said plate and being movable with the associated lever to and from the plate, a third lever mounted intermediate said first levers and movable similarly thereto, a confining element carried by the third lever and extending beyond the plane of movement of the first levers, said first levers being designed to permit movement of the third lever and the associated confining element on and off said plate irrespective of the position of the first levers.

WEBSTER A. PARR.